United States Patent
Hou et al.

(10) Patent No.: US 11,414,527 B2
(45) Date of Patent: Aug. 16, 2022

(54) TRANSPARENT COMPOSITE FILM WITH HARD COATING, METHOD FOR FORMING THE SAME AND FLEXIBLE DISPLAY DEVICE INCLUDING THE SAME

(71) Applicant: CORNING INCORPORATED, Corning, NY (US)

(72) Inventors: Jun Hou, Painted Post, NY (US); Kevin Robert McCarthy, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 285 days.

(21) Appl. No.: 16/607,874

(22) PCT Filed: Apr. 23, 2018

(86) PCT No.: PCT/US2018/028833
§ 371 (c)(1),
(2) Date: Oct. 24, 2019

(87) PCT Pub. No.: WO2018/200369
PCT Pub. Date: Nov. 1, 2018

(65) Prior Publication Data
US 2020/0190277 A1    Jun. 18, 2020

Related U.S. Application Data (60) Provisional application No. 62/490,317, filed on Apr. 26, 2017.

(51) Int. Cl.
| | | |
|---|---|---|
| B32B 27/12 | (2006.01) | |
| B32B 27/30 | (2006.01) | |
| B32B 27/40 | (2006.01) | |
| C08J 5/08 | (2006.01) | |
| C08J 5/04 | (2006.01) | |
| C08J 7/046 | (2020.01) | |
| C08J 5/18 | (2006.01) | |
| C09D 175/16 | (2006.01) | |
| G02F 1/1333 | (2006.01) | |
| C08G 18/81 | (2006.01) | |

(52) U.S. Cl.
CPC ............. *C08J 5/043* (2013.01); *B32B 27/12* (2013.01); *B32B 27/308* (2013.01); *B32B 27/40* (2013.01); *C08J 5/18* (2013.01); *C08J 7/046* (2020.01); *C09D 175/16* (2013.01); *G02F 1/133305* (2013.01); *C08G 18/8175* (2013.01); *C08J 2333/08* (2013.01); *C08J 2363/10* (2013.01); *C08J 2475/14* (2013.01)

(58) Field of Classification Search
None
See application file for complete search history.

(56) References Cited

U.S. PATENT DOCUMENTS

| | | |
|---|---|---|
| 7,132,154 B2 | 11/2006 | Shibahara et al. |
| 7,250,209 B2 | 7/2007 | Shibahara et al. |
| 7,259,803 B2 | 8/2007 | Akada et al. |
| 8,372,504 B2 | 2/2013 | Bae et al. |
| 8,801,997 B2 | 8/2014 | Bae et al. |
| 9,062,176 B2 | 6/2015 | Kishimoto et al. |
| 9,417,472 B2 | 8/2016 | Yoon et al. |
| 2002/0161154 A1* | 10/2002 | Cattron ............. C09D 4/06 526/301 |
| 2005/0129877 A1 | 6/2005 | Akada et al. |
| 2007/0188864 A1 | 8/2007 | Duncan et al. |
| 2012/0219774 A1 | 8/2012 | Kishimoto |
| 2015/0259244 A1* | 9/2015 | Amin .............. C03C 3/091 428/410 |
| 2016/0009882 A1 | 1/2016 | Yoon et al. |

FOREIGN PATENT DOCUMENTS

| | | | |
|---|---|---|---|
| CN | 1646637 A | 7/2005 | |
| CN | 1656156 A | 8/2005 | |
| CN | 101384649 A | 3/2009 | |
| CN | 106279556 A | 1/2017 | |
| CN | 106432617 A | 2/2017 | |
| JP | 07-252333 A | 10/1995 | |
| JP | 2004-051960 A | 2/2004 | |
| JP | 2012-166490 A | 9/2012 | |
| KR | 10-2005-0004876 A | 1/2005 | |
| KR | 10-2011-0116228 A | 10/2011 | |
| KR | 10-1209353 B1 | 12/2012 | |
| KR | 20130117464 A * | 10/2013 | ............. B32B 17/10 |
| KR | 10-1664735 B1 | 10/2016 | |
| WO | 2011114986 A1 | 9/2011 | |

OTHER PUBLICATIONS

Machine translation of KR-20130117464-A (no date).*
ASTM D3363-05; "Standard Test Method for Film Hardness By Pencil Test" ; pp. 422-424 (2005.
Choi et al; "Polymers for Flexible Displays: From Material Selection To Device Applications" ; Prog. Polym. Sci.; 33 (2008) pp. 581-630.
Ciba® Darocur® 1173; Ciba Specailty Chemicals; Coating Effects Segment; 4 Pages (2001).
International Search Report and Written Opinion of the International Searching Authority; PCT/US2018/028833; dated Jul. 20, 2018; 14 Pages; European Patent Office.
Chinese Patent Application No. 201880028203.8, Office Action dated Nov. 19, 2021, 14 pages (10 pages of English Translation and 4 pages of Original Copy), Chinese Patent Office.

(Continued)

*Primary Examiner* — Michael J Feely
(74) *Attorney, Agent, or Firm* — Jeffrey A. Schmidt (57) ABSTRACT

Described herein are articles and methods of making articles, including a transparent composite film having a fiber filler embedded in a polymer network and further including a hard coating. The polymer network of the film is a cured, cross-linked matrix. The hard coating is a cross-linked aromatic urethane acrylate oligomer and a photoinitiator and provides a flexible protective layer that maintains good hardness, puncture-resistance and scratch-resistance.

21 Claims, 2 Drawing Sheets

(56) References Cited

OTHER PUBLICATIONS

Taiwanese Patent Application No. 107113445, Office Action, dated Mar. 9, 2022, 2 pages; Taiwanese Patent Office.
Japanese Patent Application No. 2019-557781, Office Action, dated Mar. 2, 2022, 08 pages (04 pages of English Translation and 04 pages of Original Copy); Japanese Patent Office.
Korean Patent Application No. 10-2019-7034271, Notice of Allowance dated May 19, 2021, 5 pages (English Translation Only), Korean Patent Office.

\* cited by examiner

TRANSPARENT COMPOSITE FILM WITH HARD COATING, METHOD FOR FORMING THE SAME AND FLEXIBLE DISPLAY DEVICE INCLUDING THE SAME

CROSS-REFERENCE TO RELATED APPLICATION

This application is a national stage entry of International Patent Application Ser. No. PCT/US2018/028833, filed on Apr. 23, 2018, which in turn claims the benefit of priority under 35 U.S.C. § 119 of U.S. Provisional Application Ser. No. 62/490,317 filed on Apr. 26, 2017, the contents of each of which are relied upon and incorporated herein by reference in their entireties.

FIELD

The present disclosure relates generally to articles including and methods for making transparent composite films having a hard coating layer and, more particularly, to articles including and methods for making flexible transparent composite films having a hard coating layer that have good combinations of hardness, puncture-resistance and scratch-resistance.

BACKGROUND

Interests in flexible displays have been growing in recent years driven by desire for thin, lightweight, rugged, curved, or foldable displays with the potential of a large screen and portability. Another reason for pursuing flexible displays is the possibility of using high volume roll-to-roll manufacturing processes to reduce product and manufacturing cost. Although metal and glass are viable candidate materials for the development of flexible displays, polymeric materials are attractive because they are flexible, rugged, and compatible with roll-to-roll manufacturing processes. However, to replace glass with a polymer substrate, the polymers should mimic the properties of glass, including, among other things, high transmittance, high operating temperature and low coefficients of thermal expansion in addition to achieving superior flexibility (e.g., the ability to bend around an 1" diameter rod, and unbend, through 1000 cycles) (Myeon-Cheon Choi, etc. in Prog. Polym. Sci. 33 (2008) 581-630).

Many plastic films have been evaluated for applications in flexible displays, including polyimide, polyethylene terephthalate, polyethylene naphthalate, polyarylate, cyclic olefin copolymer and polyethersulphone. However, many plastic films have drawbacks. A high coefficient of thermal expansion, as compared with glass or silicon, is an example of one drawback of plastic materials. Polyimide has an acceptable coefficient of thermal expansion, but suffers from high birefringence and yellowness issues along with high cost related to high temperature and long processing time.

To overcome the above drawbacks, efforts have been made to incorporate a reinforcing filler material into a designed resin matrix to form composite materials. Among the reinforcing filler materials, various glass fillers have been mixed into a resin matrix to fabricate transparent composite films with improved physical and thermal properties.

U.S. Pat. No. 8,372,504 discloses a transparent composite composition including a glass filler dispersed in a crosslinked transparent siloxane resin produced by a non-hydrolytic reaction and having improved transparency and heat resistance, and a low thermal expansion coefficient. However, a condensation reaction is involved which results in the generation of volatile organic compounds and water as by-products. Moreover, an additional curing step is performed at 200° C. for 4 hours.

U.S. Pat. No. 7,250,209 discloses a transparent composite composition including a glass fiber cloth filler impregnated with a copolymer of (meth)acrylate having two or more functional groups and one or more acrylates selected from among sulfur-containing acrylates and fluorene skeleton-containing acrylates. The transparent composite composition has a low coefficient of thermal expansion and improved transparency, heat and solvent resistance. However, the transparent resin matrix has a glass transition temperature, Tg, above 150° C. and the transparent composite is made by a UV cure as well as long thermal treatments at high temperatures.

U.S. Pat. No. 7,132,154 discloses a transparent composite composition including epoxy resins and a glass fiber filler. The transparent composite composition has a low coefficient of thermal expansion, and improved transparency, heat and solvent resistance. However, the cured epoxy resin matrix has a Tg above 150° C. and the transparent composite is made by long thermal treatments at high temperatures.

U.S. Pat. No. 9,062,176 discloses a composite film formed by impregnating a resin composition containing cyanate ester resin and low refractive index resin into a glass fiber base material. Although the composite film has improved transparency, its preparation involves the use of organic solvents, and heating and pressing are preferably made at a raised temperature of 150° C. to 200° C. In addition, the cured resin composition has a Tg above 170° C.

U.S. Pat. No. 9,417,472 discloses a method for manufacturing a transparent glass-fabric reinforced polyimide film for flexible displays. The composite film has enhanced thermal and mechanical properties. However, both high processing temperature and long processing time are needed to complete the polymerization and imidization reactions. In addition, the use of organic solvents and generation of volatile by-products leads to differential shrinkage between the thinner part and the thicker part of the woven glass fabric, resulting in a roughened surface. In order for the glass-fabric reinforced polyimide film to be effectively used as a flexible display substrate, a flattening method is needed to reduce the surface roughness, as disclosed by U.S. Patent Publication No. 2016/0009882.

U.S. Pat. No. 8,801,997 discloses methods of fabricating flexible devices by surface-treating one or both sides of a carrier plate in a regionally-selective manner such that regions of different surface treatments are formed on the same side of the carrier plate. The surface treatment regions assist in the easy separation of a plastic substrate that can be formed on the carrier plate. The disclosed method however is limited by the requirement for ion or plasma treatment to deposit different surface treatments in a predetermined pattern. The disclosure further suggests a hard coating layer of a crosslinkable organic resin can be included but fails to describe specific examples or provide any meaningful disclosure of such a hard coating.

Although dimensional stability, as well as the thermal and mechanical properties of transparent films have been recently improved upon, surface hardness of such films remains inadequate for some applications such as cover windows where the surface is exposed and subject to damages from scratching and puncture.

To solve the above challenges, methods have been designed to coat a transparent composite film with a flexible hard coating. For example, U.S. Patent Publication No. 2012/0219774 discloses hard coating layers on at least one of opposite surfaces of a composite film to improve surface smoothness and hardness. However, no specifics are provided as to surface hardness with the disclosed coating layer. U.S. Pat. No. 7,259,803 also discloses a resin sheet comprising an epoxy resin, a glass fiber cloth-like material and a hard coat layer. However no specifics were provided regarding the composition or hardness of the hard coating layer.

SUMMARY

The present disclosure provides flexible transparent composite films having a hard coating layer that have good combinations of hardness, puncture-resistance and scratch-resistance.

In light of the above, there is a need for a transparent composite film comprising a hard coating that maintains the flexibility of the composite film (i.e., having a small bend radius) while providing good hardness and excellent puncture- and scratch-resistance. The transparent composite films having a hard coating can be useful as a display or optical device, or as an element, for example, a cover window, substrate, protective layer and adhesive layer in various flexible, foldable (including bendability to a small radius, for example a few millimeters, for example on the order of a few millimeters, 5 mm or less, 4 mm or less, 3 mm or less, 2 mm or less, or about 1 mm) and wearable (wherein biaxial flexure may be desirable) displays, such as liquid crystal display, electrophoretic display and organic light emitting diode display. The present disclosure describes methods to produce transparent composite films having a hard coating that exhibit the above-noted properties of flexibility, hardness and durability. The flexible transparent composite film having a hard coating layer is produced by coating a composite composition comprising a fiber filler, e.g., glass fibers, in a cross-linked polymer network with a hard coating comprising a cross-linked aromatic urethane acrylate oligomer and a photoinitiator.

In a first aspect, there is a transparent composite film comprising a composite composition and a hard coating. The composite composition comprises a fiber filler embedded in a cross-linked polymer network. The hard coating comprises a cross-linked aromatic urethane acrylate oligomer and a photoinitiator.

In some examples of aspect 1, the aromatic urethane acrylate oligomer is a multifunctional aromatic urethane acrylate oligomer.

In some examples of aspect 1, the aromatic urethane acrylate oligomer comprises a number average molecular weight (MW) of from about 750 to 2500.

In another example of aspect 1, the minimum number of acrylate functional groups (F) in the multifunctional aromatic urethane acrylate oligomer is $F=MW/250$, wherein MW is a number average molecular weight of the multifunctional aromatic urethane acrylate oligomer.

In another example of aspect 1, the hard coating further comprises a second aromatic urethane acrylate oligomer.

In another example of aspect 1, the cross-linked polymer network comprises one or more functional groups.

In another example of aspect 1, the one or more functional groups of the cross-linked polymer network comprises acrylate, ester, ether, hydroxyl or combinations thereof In another example of aspect 1, a photoinitiator is present in an amount of from about 2 weight percent to about 6 weight percent, or from about 3 weight percent to about 5 weight percent, or in an amount of about 5 weight percent.

In another example of aspect 1, the hard coating comprises a coefficient of thermal expansion (CTE) that is less than the coefficient of thermal expansion, at a temperature from 25° C. to 300° C., of the composite composition.

In another example of aspect 1, the transparent composite film comprises a bend radius of less than about 5 mm.

In another example of aspect 1, the transparent composite film comprises a bend radius of less than about 2 mm.

In another example of aspect 1, transparent composite film comprises a Pencil Hardness greater than or equal to about 5 H.

In yet another example, the transparent composite film comprises a Pencil Hardness greater than or equal to about 8 H.

In another example of aspect 1, the fiber filler is a woven fabric, preferably of glass fibers.

In another example of aspect 1, the hard coating comprises an average thickness of less than or equal to about 25 μm.

In another example of aspect 1, the composite composition comprises an average thickness of less than or equal to about 200 μm.

In another example of aspect 1, the composite composition comprises an average thickness of less than or equal to about 55 μm.

In another example of aspect 1, the hard coating is present on opposite sides of the composite transparent film composition.

In yet another example of aspect 1, a consumer electronic product comprises a housing having a front surface, a back surface and side surfaces. The consumer electronic product further comprises electrical components provided at least partially within the housing, the electrical components including at least a controller, a memory, and a display. The display of this example is provided at or adjacent to the front surface of the housing. The consumer electronic product further comprises a cover material disposed over the display, wherein at least a portion of the housing or cover material comprises the transparent composite film of aspect 1.

In a second aspect, a method for making a transparent composite film comprises:

applying a resin composition comprising one of more acrylate-functionalized monomers onto a filler fiber;

at least partially curing the resin composition;

applying a hard coating composition comprising one or more aromatic urethane acrylate oligomers and a photoinitiator;

at least partially curing the hard coating composition; and finally curing the transparent composite film.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

The accompanying drawings are included to provide a further understanding of principles of the disclosure, and are incorporated in and constitute a part of this specification. The drawings illustrate some examples(s), and together with the description serve to explain, by way of example, principles and operation thereof. It is to be understood that various features disclosed in this specification and in the drawings can be used in any and all combinations. By way of non-limiting example the various features may be combined with one another as set forth in the specification, above, as aspects.

BRIEF DESCRIPTION OF THE DRAWINGS

The above and other features, examples and advantages of aspects of the examples disclosed in the present specification are better understood when the following detailed description thereof is read with reference to the accompanying drawings, in which.

DETAILED DESCRIPTION

Examples will now be described more fully hereinafter with reference to the accompanying drawings. Whenever possible, the same reference numerals are used throughout the drawings to refer to the same or like parts. However, the claimed subject matter may be embodied in many different forms and should not be construed as limited to the examples set forth herein.

Directional terms as used herein (e.g., up, down, right left, front, back, top, bottom) are made only with reference to the figures as drawn and are not intended to imply absolute orientation.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The present disclosure provides transparent composite films comprising a hard coating that have good combinations, or an advantageous balance, of small bend radius, high Pencil Hardness, and excellent flexibility, puncture-resistance and scratch-resistance. For example, the transparent composite film has a bend radius of less than about 5 mm, for example 4 mm or less, 3 mm or less, 2 mm or less, or about 1 mm. The transparent composite films of the present disclosure additionally have a Pencil Hardness of greater than or equal to about 5 H, preferably greater than or equal to about 8 H. When the hard coating is provided at an average thickness of less than or equal to about 25 μm, the transparent composite films are crack-free following the final cure. When the hard coating is applied to both sides of the composite transparent film composition, there is no buckling of the final surface of the hard coating.

In one or more embodiments, the transparent composite film includes a composite composition. The composite composition comprises a fiber filler embedded in a cross-linked polymer network. The fiber filler of the transparent composite film can include any suitable fiber filler. Preferably the fiber filler has a low thermal expansion coefficient or contributes to a transparent composite film having a low thermal expansion coefficient. Examples of suitable fiber fillers include glass fibers, glass cloths, woven glass fiber fabric, nonwoven glass fiber fabrics and other glass fiber cloths or quartz fibers. Among them, glass fibers, glass cloths, woven and nonwoven glass fiber fabrics are preferred in view of their being highly effective in reducing the coefficient of linear expansion.

In one or more embodiments, the fiber filler includes glass (e.g., glass fiber). The glass can include glass species, for example, non-alkali glass, E glass, C glass, A glass, S glass, D glass, NE glass, T glass, quartz, low inductivity glass, and high inductivity glass.

The refractive index of the fiber filler incorporated in the transparent composite film of the present disclosure is not restricted. For example, glass fiber can have a refractive index in the range of about 1.46 to about 1.57. The fiber filler is preferred to have refractive index of about 1.54 to about 1.57, and more preferably of about 1.55 to about 1.56, including any ranges and subranges therebetween. The use of fiber filler having the refractive index in the above preferred range provides a transparent composite film with excellent visibility. An exemplary fiber filler according to the present disclosure is 1080E-glass (available from Jushi Group Co., Ltd., a Chinese limited company with offices at 669 Wenhua Road (south), Economic Development Zone, Tongxiang Zhejiang 314500 China).

The fiber filler according to the present embodiments is embedded in a cross-linked polymer network to form a composite transparent film composition. Materials used to form the polymer network may be any of those capable of crosslinking upon heating or exposure to radiation (e.g., actinic radiation). Preferred from the transparency and heat resistance viewpoint are (meth)acrylates. In one or more embodiments, the cross-linked polymer network comprises one or more functional groups. Preferred functional groups according to the present disclosure are acrylates, esters, ethers, hydroxyls or combinations thereof. In some embodiments, the composite composition may be used as a cover material for a foldable electronic device in which the typically diametrically opposed attributes of puncture resistance and bendability to a small radius are both desirable. The composite transparent film composition can be designed to achieve both a good puncture resistance and bendability to a small bend radius (for example about a few millimeters or less, for example about 3 mm or less, or about 2 mm or less, or about 1 mm or less) by an appropriate selection and mixture of monomers and oligomers. Non-limiting examples of monomers and oligomers for use with the current disclosure include:

(1)

wherein m=3 to 8, m+n=5 to 16, and $R_1$=H or methyl;

(2)

wherein x=0 to 2, $R_2$=H or methyl, and Y is a compound of formula (3) or (4)

(3)

(4)

wherein $R_3$ is H or methyl; and (5)

wherein $R_4$ is H or methyl.

To provide excellent transparency in the transparent composite film, the polymer network has a refractive index different from the refractive index of the fiber filler by about 0.01 or less, preferably about 0.008 or less, and more preferably about 0.005 or less. When the difference in refractive index of the polymer network and fiber filler is greater than 0.01, the resultant transparent composite film may show an insufficient or degraded transparency for use in display devices. The refractive index of the polymer network to be used with the fiber filler may be adjusted.

The composite composition can be cured to form a cross-linked polymer network. Likewise the aromatic urethane acrylate oligomer can be cured to form a cross-linked hard coating. Available for crosslinking the components of the transparent composite film are methods that include inducing curing by means of actinic radiation or thermal polymerization by heating. The curing methods may be used in combination. For example, for the purpose of completing a polymerization reaction, and preferably lowering the coefficient of linear expansion, it is preferred that the step of curing by means of actinic radiation and/or thermal polymerization (e.g., application of heat) is not followed by further high temperature heat treatment, for example, raising the temperature of the cured composition above about 80° C., about 100° C. or 120° C. Radiation can include any suitable radiation source, for instance, ultraviolet light can be used as the actinic radiation source. Ultraviolet light can be generated with metal halide lamps, high-pressure mercury lamps, and the like.

The hard coating comprises one or more oligomers, one or more of which is an aromatic urethane acrylate oligomer, preferably a multifunctional aromatic urethane acrylate oligomer. The aromatic urethane acrylate oligomer according to the present disclosure has a number average molecular weight of from about 750 to about 2500 including any ranges and subranges therebetween. Preferably the average molecular weight of the oligomer is from about 1000 to about 2000. The minimum number of acrylate groups of the aromatic urethane acrylate oligomer is preferably determined according to the following Equation (1):

$$F=MW/250 \qquad (1),$$

wherein F=minimum number of acrylate groups and MW is a number average molecular weight of the aromatic urethane acrylate oligomer. The hard coating can comprise one or more aromatic urethane acrylate oligomers. When the hard coating comprises more than one aromatic urethane acrylate oligomer, preferably each oligomer satisfies Equation (1). When the hard coating is provided on opposite surfaces of the composite composition, the aromatic urethane acrylate oligomers forming the hard coating on either side can be the same or different and may vary from application to application. An exemplary oligomer for use in the present disclosure is Miramer PU662NT, a hexafunctional acrylate oligomer from Miwon Specialty Chemical Co., Ltd., Korea.

The hard coating and the composite composition of the present disclosure should be chemically compatible. This can be achieved in the examples presented herein based on 1) the oligomers of the hard coating and the oligomers of the cross-linked polymer network having the same acrylate functionalities; and 2) the presence of the urethane functional groups in the oligomer of the hard coating interacting strongly with the ester, ether and/or hydroxyl functional groups present in the oligomers of the cross-linked polymer network through hydrogen bonding or polar-polar interactions, thereby enhancing adhesion at the interface between the layers.

One difference between the hard coating composition and the composite composition lies in the fact that the former has a lower coefficient of thermal expansion (CTE) and thereby experiences higher shrinkage during cure. Consequently, the hard coated composite film may have stress on the coated surface which may be more pronounced as the coating thickness increases. Severe stress may lead to cracking or buckling. Embodiments of the current disclosure provide a hard coating that does not crack or buckle when coated on the surfaces of the composite composition.

In crosslinking/curing the oligomers of the cross-linked polymer network or the oligomer of the hard coating by actinic radiation, for example by ultraviolet irradiation, a curing agent (e.g., radical-generating photopolymerization initiator) is preferably added to the composition. For example, the curing agent can be present in either or both of the composite composition and/or hard coating in an amount in the range of about 0.1 to about 6 weight percent (wt. %), including any subranges therebetween. The curing agent can be present in the composite composition in an amount of from about 0.1 to about 3 weight percent, about 0.5 to about 2.5 weight percent, or about 1, 1.5 or 2 weight percent, including any ranges and subranges therebetween. The curing agent can be present in the hard coating in an amount of about 3 to about 5 weight percent or about 4 weight percent or about 5 weight percent, including any ranges and subranges therebetween. Examples of a curing agent can include, but are not limited to, α-hydroxy ketones, benzophenone, benzoin methyl ether, benzoin propyl ether, diethoxyacetophenone, 1-hydroxycyclohexyl phenyl ketone, 2,6-dimethylbenzoyldiphenylphosphine oxide, and 2,4,6-trimethylbenzoyldiphenylphosphine oxide. Two or more curing agents may be used in combination in the either or both of the composite composition and/or the hard coating.

The composite composition and the hard coating are preferably free of compounds that can generate volatile species during formation of the transparent composite film. The composite composition and/or the hard coating can be free of such compounds related to volatile species, for example, water or small organic compounds and organic solvents. The exclusion of organic solvent and water from the composite composition and/or the hard coating during formation thereof or before curing can eliminate or substantially reduce the generation of volatile species due to hydrolysis or condensation during the cure period.

Transparent Composite Film

Figure 1:
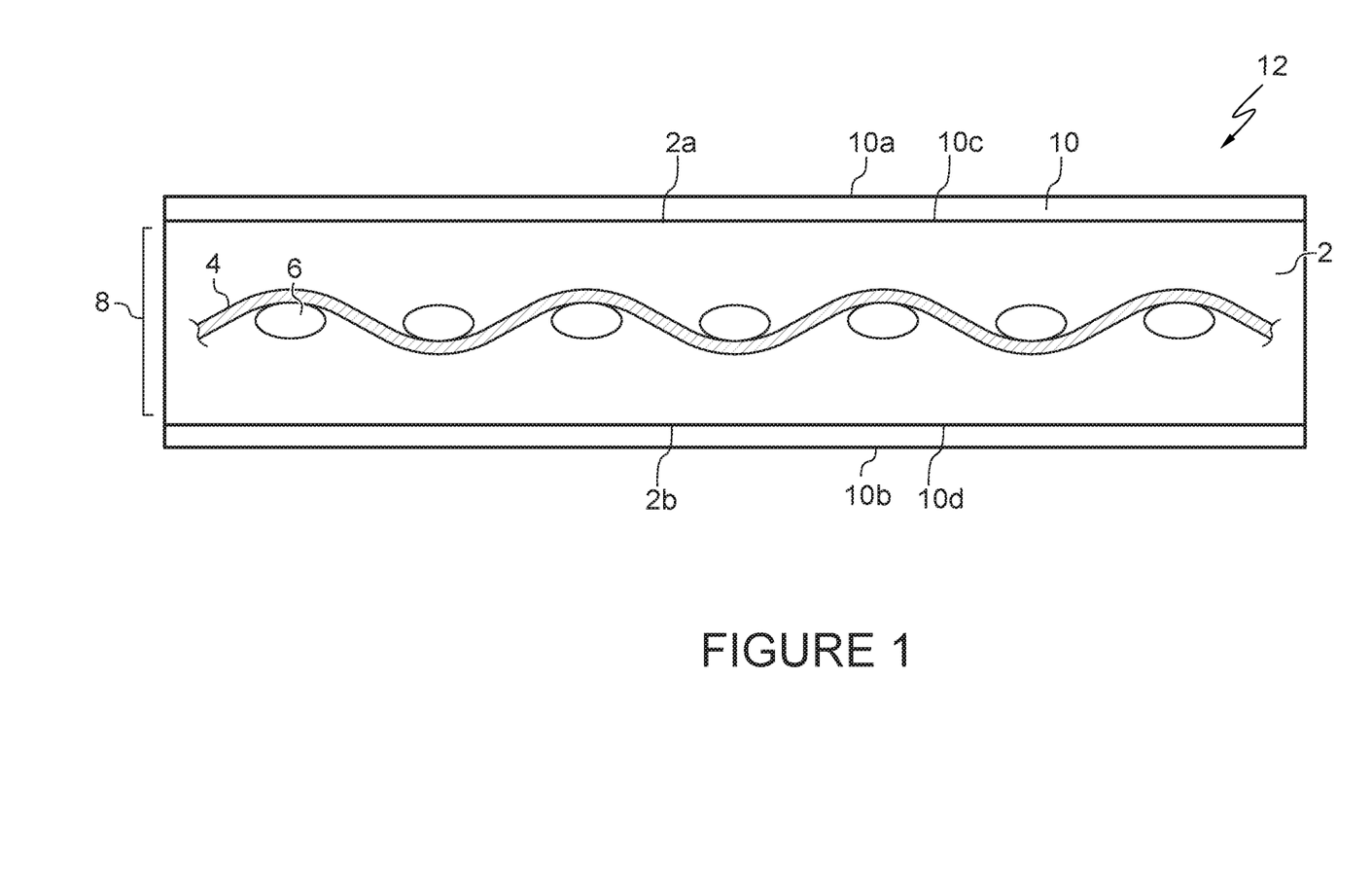
FIG. 1 is a cross-section view of a transparent composite film comprising a hard coating according to one or more embodiments.

As shown in FIG. 1, a transparent composite film 12 includes a composite composition 8 comprising a polymer network 2 having an embedded fiber filler 4, 6. The composite composition 8 has an average thickness of less than or equal to about 200 micrometers (μm, or microns), preferably less than or equal to about 100 micrometers, more preferably from about 50 micrometers to about 60 micrometers, including any ranges and subranges therebetween.

The fiber filler 4, 6 can be made of glass fibers. As shown, the fiber filler is a flat, horizontal woven fabric or cloth of glass fibers 4, 6 embedded within the polymer network 2. Preferably, the fiber filler is entirely covered by the polymer network 2 and embedded at or near the middle or center of the thickness of the polymer network 2. The fiber filler can alternatively include two or more fiber fillers, for example, two or more woven fabrics (not shown).

The polymer network 2 of the film 12 is preferably a cross-linked polymer network comprising one or more functional groups. The composite composition 8 can be obtained from a cure of a polymeric composition containing one or more oligomers as disclosed herein. The polymer network 2 has at least a first surface 2a and a second surface 2b and can be obtained from a cure of a composition as described herein.

The film 12 further comprises a hard coating 10 which may include a first surface 10a, a second surface 10b, a third surface 10c, and a fourth surface 10d. The first surface 10a and the second surface 10b preferably have a smooth and uniform surface and are substantially parallel to one another. The third surface 10c and the fourth surface 10d are in at least partial, more preferably substantial, and more preferably total contact with the first surface 2a and the second surface 2b, respectfully, of the polymeric network 2. In other embodiments, the film 12 comprises a one-sided hard coating comprising two surfaces, 10a and 10c, wherein the surface 10c is in at least partial, more preferably substantial, and more preferably total contact with the surface 2a of the polymer network. The hard coating 10 comprises one or more oligomers, one or more of which is a cross-linked aromatic urethane acrylate oligomer, preferably a multifunctional aromatic urethane acrylate oligomer, and a photoinitiator. The average thickness of each layer of the hard coating present (i.e., of each the thickness from 10a to 10c, and from 10b to 10d) is less than or equal to about 25 micrometers and can be obtained from a cure of a composition as described herein. The hard coating 10 can be included on one (not shown) or both sides of the composite composition 8. The hard coating 10 can also be present on the ends of the composite composition 8. When present on both of the top and bottom surfaces, the average thickness of each side of the hard coating 10 is preferably less than or equal to 25 micrometers. When present on both the top and bottom surfaces, the average thicknesses of each side of the hard coating can be the same or different and may vary depending on the application. When present as a one-sided hard coating, the average thickness of the hard coating 10 is preferably less than or equal to 25 micrometers.

The film 12 including the composite composition 8 and the hard coating 10 can have an average thickness equal to or less than about 300 micrometers, including but not limited to an average thickness of, for example, about 20 to about 250 micrometers, about 40 to about 200 micrometers, about 70 to about 120 micrometers, or about 90 micrometers, about 95 micrometers, about 100 micrometers, or about 105 micrometers, including any ranges and subranges therebetween.

Production of the Transparent Composite Film

The transparent composite film can be prepared by any suitable method. Suitable production methods can include, but are not limited to, vacuum bag molding, doctor blade extrusion and dipping of fiber filler into resin matrix followed by shaping, e.g., between a base support and a top cover. Treated glass or polymer release films having low roughness surfaces can be used as the base support, top cover, or both. Thickness of the transparent composite film can be controlled by conventional techniques. For example, a dimensionally stable spacer material (e.g., a metal or polymer adhesive) can be used. In another example, a roller or lamination apparatus can be used to remove trapped air out and form a thin sheet for curing.

In some embodiments, the transparent composite film is compatible with and formed with a roll-to-roll manufacturing process. Production with a roll-to-roll manufacturing process can include the following steps. In a first step, a composition for wetting the fiber filler and forming a polymer network is formed. In some examples, a composition can be formed by mixing one or more oligomers and a curing agent to form a well-mixed or dispersed mixture. Heat can optionally be applied to the composition during mixing. To better facilitate wetting of the fiber filler, the mixed composition can be held at an elevated temperature. In some examples, the composition can be held at a temperature in the range of about 40° C. to about 80° C., and preferably about 50° C. to about 70° C., to reduce the viscosity of the composition for application to the fiber filler (e.g., a glass fiber cloth).

A release film can be used, for example in the form of a roll on a conveyor belt system, as a base material for applying a portion of the oligomer composition for making the polymer network (i.e., polymer network composition) (e.g., about half of the total amount of polymer network composition being used to form the composite composition). Release films having a low surface roughness are preferred. An example of a release film is a polyethylene terephthalate film, which can be optionally coated with a hydrophobic acrylic layer. The polymer network composition can be applied evenly over the base material by a suitable method. A trough or nozzles can be used to coat the base material with a portion of the polymer network composition. A pre-determined amount of the polymer network composition can be applied to achieve a desired average thickness on the base material.

Fiber filler can be positioned on top of the polymer network composition that exists on the base material as a liquid coating. In some examples, a roll of woven fabric of glass fibers can be applied to the liquid coating such that the fabric sits on top of the coating on the base material.

An additional amount of the polymer network composition can be applied to the fiber filler in contact with the portion of the polymer network composition on the base material. For example, a pre-determined amount of liquid polymer network composition can be applied evenly on top of the fiber filler resting on the release film to achieve a desired film thickness. The application of a second portion of the polymer network composition forms an uncured composite film having an embedded fiber filler therein.

In another step, a second release film can be applied to the exposed surface of the uncured composite composition opposite the first release film to form an uncured composite film sandwiched between release layers, namely, a release film/uncured polymer network composition/fiber filler/uncured polymer network composition/release film stack. The stack can be transferred through a pair of rollers to form an uncured composite composition having a uniform thickness. To cure the composite composition, an energy source can be applied to the composition as described in the present disclosure. Examples of radiation curing energy sources include ultraviolent light or electron beam. The formed transparent composite composition can be collected and separated from the release films.

The hard coating can be applied to one or more surface of the composite composition. A hard coating composition can be made by blending a mixture of one or more oligomers, one or more of which is an aromatic urethane acrylate oligomer, and a photoinitiator. The photoinitiator can be present preferably in an amount of from about 2 weight percent to about 6 weight percent of the composition. If the concentration of the photoinitiator is too low, not all of the acrylate functional groups will be cross-linked upon curing the hard coating, and the hardness of the hard coating will be adversely affected. If the concentration of the photoinitiator is too high, the hard coating composition is diluted which will also adversely impact the hardness of the coating. Heat can optionally be applied to the oligomer composition during mixing. A layer of the hard coating composition can be drawn down on a surface using a draw down bar for desired thickness. The hard coat composition can be fully cured or partially cured according to methods disclosed herein, or other methods known in the art. As used herein, "partial cure" or "partially cured" means that the oligomer composition is less than fully cured. According to the present embodiments, a partial cure may be one in which a dose of less than 1250 mJ/cm$^2$ (based on a Fusion UV 300 W "D" bulb lamp at 50% power (UV intensity ~2000 mW/cm$^2$) with a nitrogen purge) is provided to the polymer network composition and/or the hard coating composition, as described below, such as 1200 mJ/cm$^2$, 1100 mJ/cm$^2$, 1000 mJ/cm$^2$, 900 mJ/cm$^2$, 800 mJ/cm$^2$, 700 mJ/cm$^2$, 600 mJ/cm$^2$, 500 mJ/cm$^2$, or less, and may be dependent on the oligomers used. The composite composition can then be placed on top of the hard coat layer, and optionally, a second hard coating layer can be drawn on top of the composite composition using the casting bar to obtain the desired total thickness prior to finally curing the composite film according to methods described herein. Alternatively, in the case of a one-sided coating, the composite composition can be formed on a release film with no hard coating material thereon or the hard coat layer may be left off of the top of the composite composition.

In an alternate method for applying the hard coating to the composite composition, layers of hard coat can be formed and partially cured as described above. The hard coating layers should be sufficiently cured to as to ensure enough mechanical integrity for easy handling. The composite composition can then be sandwiched between two partially cured layers of hard coating. The layered film can then be fed through a nip roller or a hot press to remove any trapped air and to partially adhere the films. The laminate structure is then locked in place by a final cure step as detailed herein. As a further alternative, either of the foregoing methods may apply hard coat to one side of the composite composition.

Figure 2A:
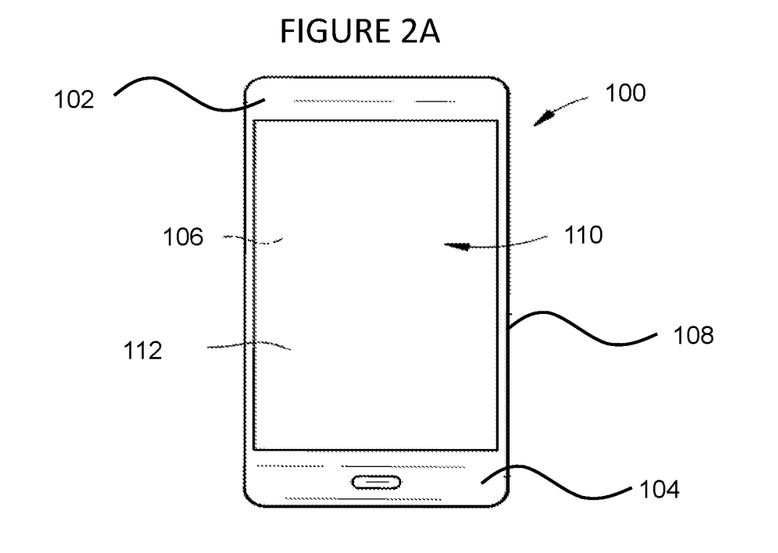
FIG. 2A is a plan view of an exemplary electronic device incorporating any of the strengthened articles disclosed herein.
Figure 2B:
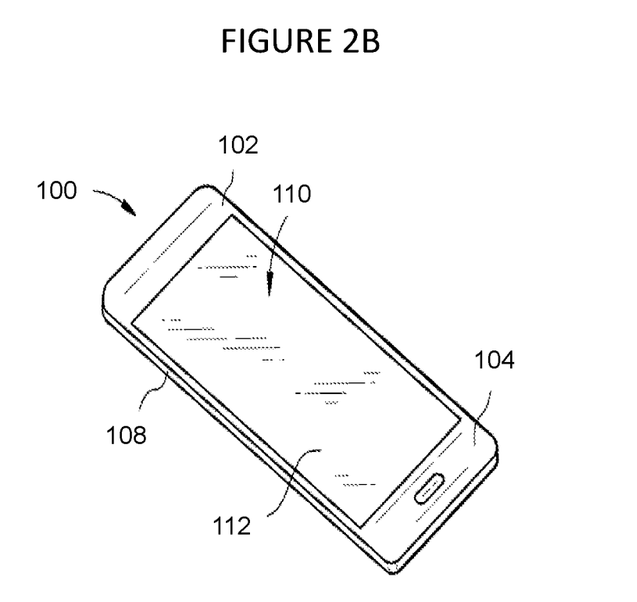
FIG. 2B is a perspective view of the exemplary electronic device of FIG. 2A.

The transparent composite film disclosed herein may be incorporated into another article such as an article with a display (or display articles) (e.g., consumer electronics, including mobile phones, tablets, computers, navigation systems, foldable display, wearable devices (e.g., watches) and the like), architectural articles, transportation articles (e.g., automotive, trains, aircraft, sea craft, etc.), appliance articles, or any article that would benefit from some transparency, scratch-resistance, abrasion resistance, puncture resistance, and/or flexibility, or a combination thereof. An exemplary article incorporating any of the composite films disclosed herein is shown in FIGS. 2A and 2B. Specifically, FIGS. 2A and 2B show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In some embodiments, the cover substrate 112 may include any of the composite films disclosed herein. In some embodiments, at least one of a portion of the housing or the cover glass comprises the composite films disclosed herein.

EXAMPLES

Measurements provided in the present disclosure and in the examples herein are based on the following test procedures.

Pencil Hardness

A Gardco HA-3363 Pencil Scratch Hardness Tester was used to measure the Pencil Hardness using a 1 kgf load. Results are shown in Table 1, wherein a check mark indicates that the film achieved a Pencil Hardness of 8H or more.

Flexibility Test

A 5 mm×20 mm film was bent from a 5 mm bend radius to a 2 mm radius (as measured by a micrometer, i.e., parallel plate bending) or to break, whichever came first, and results are shown in Table 1. A check mark is recorded in Table 1 if the film survived the 2 mm bend radius without break.

Visual Appearance

The film was inspected visually, with the naked eye under ambient lighting, immediately after cure for cracking and buckling and results are shown in Table 1. A check mark was recorded if no cracking or buckling was observed; an X was recorded otherwise.

Example 1

A resin polymer network composition composed of 61.5 weight percent (i.e. wt. %) of M2100 (ethoxylated (10)

bisphenol A diacrylate, refractive index 1.516, Miwon Specialty Chemical Co., Ltd), 22 wt. % of PE210HA (bisphenol A epoxy acrylate, refractive index 1.562, Miwon Specialty Chemical Co., Ltd), 15 wt. % of M1142 (o-phenylphenol ethyl acrylate, refractive index 1.577, Miwon Specialty Chemical Co., Ltd), and 1.5 wt. % of Omnirad TPO-L photo-initiator (diphenyl (2,4,6-trimethylbenzoyl) phosphine oxide, BASF Canada Inc.) was prepared by mixing in a glass jacketed beaker at 60-65° C. until homogeneous. A portion of this resin composition was placed on a release film, a woven glass fabric (1080 E-glass, 40 μm thick, and refractive index 1.560, from Jushi Group) was placed on top of the resin-coated release film, and a second portion of the resin was placed on top of the woven glass fabric. Wetting continued at about 60° C. for 30 minutes. The polymer network composition was covered by another layer of the release film. A slight excess amount of resin was used to fully wet the glass fabric. A shim material was used to control the thickness to the desired level (i.e., a shim of the desired final thickness of the composite film is used to separate the roller and the surface supporting the composite film), and a handheld roller was used to remove the air bubbles and excess amount of resin liquid. The composite was then cured using a Fusion UV 300 W "D" bulb lamp at 50% power (UV intensity ~2000 mW/cm$^2$) with a nitrogen purge. The composite received a dose of approximately 1250 mJ/cm$^2$. The cured composite was allowed to condition overnight in a controlled environment at 23° C. and 50% relative humidity before testing. The composite composition thus fabricated had an average thickness of 55 μm.

A hard coating formulation was made by blending a mixture of 95% PU662NT (an aromatic urethane hexafunctional acrylate oligomer from Miwon) and 5% Irgacure 1173 photoinitiator at 60-65° C. The first layer of hard coat film was prepared by drawing down the hard coating composition on a 2"×3" glass microscope slide using a draw down bar for desired thickness. The film was subject to the same conditions as described above for curing except it was partially cured. The 55 μm composite composition prepared above was cut into 2"×3" pieces and attached to the partially cured hard coat. Total thickness was measured. Another layer of hard coat composition was cast on top of the composite composition using the casting bar for the desired thickness (<25 μm) and finally cured. The cured composite film was then examined for cracking, flexibility, buckling and Pencil Hardness. The results are shown in Table 1.

Example 2

A resin polymer network composition composed of 56.5 wt. % of M2100 (ethoxylated (10) bisphenol A diacrylate, refractive index 1.516, Miwon Specialty Chemical Co., Ltd), 22 wt. % of PE210 (bisphenol A epoxy diacrylate, refractive index 1.557, Miwon Specialty Chemical Co., Ltd.), 20 wt. % of M1142 (o-phenylphenol ethyl acrylate, refractive index 1.577, Miwon Specialty Chemical Co., Ltd.), and 1.5 wt. % of Omnirad TPO-L photo-initiator (diphenyl (2,4,6-trimethylbenzoyl) phosphine oxide, BASF Canada Inc.) was prepared in the same was as described for Example 1. A composite composition was prepared in the same way as stated in Example 1 except that the average thickness of the composition was 53 μm. The composite composition was coated on both sides using the hard coating composition described in Example 1 to afford a transparent composite film. The cured composite film was then examined for cracking, flexibility, buckling and Pencil Hardness. Film properties are shown in Table 1.

Comparative Example 1

A composite composition with an average thickness of 55 μm was prepared in the same way as stated in Example 1 and coated with the same hard coating composition on both sides of the film. The average thickness of each of the top and bottom hard coatings was 30 μm. The cured composite film was then examined for cracking, flexibility, buckling and Pencil Hardness. Film properties are shown in Table 1.

Comparative Example 2

A composite composition with an average thickness of 70 μm was prepared in the same way as stated in Example 2 and coated with the same hard coating composition on both sides of the film. The average thickness of each of the top and bottom hard coatings was 37 μm. The cured composite film was then examined for cracking, flexibility, buckling and Pencil Hardness. Film properties are shown in Table 1.

Comparative Example 3

A composite composition having a thickness of 68 μm was prepared in the same way as stated in Example 1 and coated with the same hard coating composition on one side of the film. The average thickness of the hard coating was 50 μm. The cured composite film was then examined for cracking, flexibility, buckling and Pencil Hardness. Film properties are shown in Table 1.

Comparative Example 4

A composite composition with an average thickness of 55 μm was prepared in the same way as stated in Example 2 and coated with the same hard coating composition on one side of the film. The average thickness of the hard coating was 50 μm. The cured composite film was then examined for cracking, flexibility, buckling and Pencil Hardness. Film properties are shown in Table 1.

Comparative Example 5

A composite composition with an average thickness of 55 μm was prepared in the same way as stated in Example 2 except that Jushi 1080 woven glass fabric was not used. The cured composite composition was coated with the same hard coating composition on both sides of the film. The average thickness of each of the top and bottom hard coatings was >25 μm. The cured composite film was then examined for cracking, flexibility, buckling and Pencil Hardness. Film properties are shown in Table 1.

TABLE 1

| Examples | M2100 (wt %) | PE210 (wt %) | PE210HA (wt %) | M1 142 (wt %) | Jushi 1080 | Film Thickness (μm) | Both sides coated | Thickness of coating < 25 μm | Pencil hardness > 8H | Crack-free after cure | No break at R = 2 mm bend radius | No buckling |
|---|---|---|---|---|---|---|---|---|---|---|---|---|
| Ex. 1 | 61.5 | 0 | 22 | 15 | ✓ | 55 | ✓ | ✓ | ✓ | ✓ | ✓ | ✓ |
| Ex. 2 | 56.5 | 22 | 0 | 20 | ✓ | 53 | ✓ | ✓ | ✓ | ✓ | ✓ | ✓ |
| Comp. Ex. 1 | 61.5 | 0 | 22 | 15 | ✓ | 55 | ✓ | X | ✓ | X | ✓ | ✓ |
| Comp. Ex. 2 | 56.5 | 22 | 0 | 20 | ✓ | 70 | ✓ | X | ✓ | X | ✓ | ✓ |
| Comp. Ex. 3 | 61.5 | 0 | 22 | 15 | ✓ | 68 | X | X | — | X | ✓ | X |
| Comp. Ex. 4 | 56.5 | 22 | 0 | 20 | ✓ | 55 | X | X | — | X | ✓ | X |
| Comp. Ex. 5 | 56.5 | 22 | 0 | 20 | X | 55 | ✓ | X | X | X | ✓ | ✓ |

In Table 1, for any particular column, a check mark indicates that the example or comparative example had the property listed in the column heading. Similarly, an X indicates that the particular example or comparative example did not have the property listed in the column heading. A dash mark in Table 1 indicates that the property was not measured. As shown in Table 1, the transparent composite films including a hard coating comprising a cross-linked aromatic urethane acrylate oligomer show a combination of excellent Pencil Hardness (>8H), excellent flexibility (do not break at a 2 mm bend radius) and are crack-free and buckle-free when coated on both sides at an average thickness of less than 25 μm (see Examples 1 and 2). In contrast, cracking of the coating following the final cure occurs when the average thickness of the coating is too thick, i.e., greater than 25 μm (see Comparative Examples 1-5). Buckling of the film occurs when the composite composition is coated with hard coating on one side (see Comparative Examples 3-4). When the Jushi woven glass fabric is not included as part of the composite composition, the film does not have a Pencil Hardness of greater than 8H as is desirable.

It will be apparent to those skilled in the art that various modifications and variations can be made to the examples disclosed herein without departing from the spirit and scope of the claimed subject matter. Many variations and modifications may be made to the above-described examples without departing substantially from the spirit and various principles described. All such modifications and variations are intended to be included herein within the scope of this disclosure and protected by the following claims.

What is claimed is:

1. A flexible transparent composite film comprising:
   a film of a composite composition, the composite composition comprising a cross-linked polymer network, a fiber filler embedded in the cross-linked polymer network, and an optional photoinitiator; and
   a hard coating provided on one or both sides of the composite composition film, the hard coating comprising a cross-linked hard coating composition, the hard coating composition comprising an aromatic urethane acrylate oligomer and a photoinitiator;
   wherein the flexible transparent composite film comprises a bend radius of less than about 5 mm and a Pencil Hardness greater than or equal to about 5 H.

2. The flexible transparent composite film of claim 1, wherein the aromatic urethane acrylate oligomer is a multifunctional aromatic urethane acrylate oligomer.

3. The flexible transparent composite film of claim 1, wherein the aromatic urethane acrylate oligomer comprises a number average molecular weight (MW) of from about 750 to about 2500.

4. The flexible transparent composite film of claim 1, wherein a minimum number of acrylate functional groups (F) in the aromatic urethane acrylate oligomer follows the following equation:

$$F = MW/250,$$

wherein MW is a number average molecular weight of the aromatic urethane acrylate oligomer.

5. The flexible transparent composite film of claim 1, wherein the hard coating composition further comprises a second aromatic urethane acrylate oligomer.

6. The flexible transparent composite film of claim 1, wherein the cross-linked polymer network comprises one or more functional group.

7. The flexible transparent composite film of claim 6, wherein the one or more functional group comprises acrylate, ester, ether, hydroxyl, or combinations thereof.

8. The flexible transparent composite film of claim 1, wherein the photoinitiator is present in the hard coating and optionally present in the composite composition, in an amount from about 2 weight percent to about 6 weight percent, based on the weight of each of the hard coating and the composite composition.

9. The flexible transparent composite film of claim 8, wherein the photoinitiator is present in the hard coating, in an amount from about 3 weight percent to about 5 weight percent, based on the weight of the hard coating.

10. The flexible transparent composite film of claim 9, wherein the photoinitiator is present in the hard coating, in an amount of about 5 weight percent, based on the weight of the hard coating.

11. The flexible transparent composite film of claim 1, wherein the hard coating comprises a coefficient of thermal expansion, at a temperature that is from 25° C. to 300° C., that is less than a coefficient of thermal expansion of the composite composition film.

12. The flexible transparent composite film of claim 1, wherein the bend radius is less than about 2 mm.

13. The flexible transparent composite film of claim 1, wherein the Pencil Hardness is greater than or equal to about 8 H.

14. The flexible transparent composite film of claim 1, wherein the fiber filler comprises glass fibers.

15. The flexible transparent composite film of claim 1, wherein the hard coating comprises an average thickness of less than or equal to about 25 μm.

16. The flexible transparent composite film of claim 1, wherein the composite composition film comprises an average thickness of less than or equal to about 200 μm.

17. The flexible transparent composite film of claim 16, wherein the composite composition film has an average thickness of less than or equal to about 55 μm.

18. The flexible transparent composite film of claim 1, wherein the hard coating is provided on both sides of the composite composition film.

19. The flexible transparent composite film of claim 1, wherein the fiber filler is a woven fiber fabric.

20. A consumer electronic product, comprising:
- a housing comprising a front surface, a back surface and side surfaces;
- electrical components at least partially within the housing, the electrical components comprising at least a controller, a memory, and a display, the display at or adjacent the front surface of the housing; and
- a cover material disposed over the display,
- wherein at least one of a portion of the housing or the cover material comprises the flexible transparent composite film of claim 1.

21. A method for making a flexible transparent composite film comprising:
- applying a resin composition onto a fiber filler, the resin composition comprising one or more acrylate-functionalized monomers and an optional photoinitiator;
- at least partially curing the resin composition to form a film of a composite composition, the composite composition comprising an at least partially cross-linked polymer network, the fiber filler embedded in the at least partially cross-linked polymer network, and the optional photoinitiator;
- applying a hard coating composition to one side of the composite composition film, the hard coating composition comprising one or more aromatic urethane acrylate oligomers and a photoinitiator;
- at least partially curing the hard coating composition to form a first hard coating;
- optionally applying the hard coating composition to the other side of the composite composition film, and at least partially curing the hard coating composition to form a second hard coating; and
- finally curing the flexible transparent composite film;
- wherein the flexible transparent composite film comprises a bend radius of less than about 5 mm and a Pencil Hardness greater than or equal to about 5 H.

* * * * *